(12) United States Patent
Sacksteder

(10) Patent No.: US 7,019,645 B2
(45) Date of Patent: Mar. 28, 2006

(54) METHOD FOR MANAGING RECEIVER MEANS OF A TRANSPONDER ADAPTED TO COMMUNICATE AT RELATIVELY LONG DISTANCE

(75) Inventor: Frédéric Sacksteder, Lausen (CH)

(73) Assignee: EM Microelectronic-Marin SA, Marin (CH)

( * ) Notice: Subject to any disclaimer, the term of this patent is extended or adjusted under 35 U.S.C. 154(b) by 60 days.

(21) Appl. No.: 10/490,171

(22) PCT Filed: Sep. 3, 2002

(86) PCT No.: PCT/EP02/09818

§ 371 (c)(1),
(2), (4) Date: Mar. 19, 2004

(87) PCT Pub. No.: WO03/027938

PCT Pub. Date: Apr. 3, 2003

(65) Prior Publication Data

US 2004/0239485 A1    Dec. 2, 2004

(30) Foreign Application Priority Data

Sep. 21, 2001   (EP) ................................ 01203583

(51) Int. Cl.
    *G08B 1/08* (2006.01)
(52) U.S. Cl. .................... 340/539.22; 340/572.2; 340/572.4
(58) Field of Classification Search .......... 340/539.22, 340/572.2, 572.4, 572.5; 455/106, 104, 109; 342/51

See application file for complete search history.

(56) References Cited

U.S. PATENT DOCUMENTS

| 5,721,552 | A | | 2/1998 | Rossius et al. |
| 5,822,685 | A | * | 10/1998 | Forster ....................... 455/106 |
| 6,087,933 | A | * | 7/2000 | Addy et al. ............. 340/539.24 |
| 6,181,198 | B1 | * | 1/2001 | Poletto et al. .............. 329/358 |
| 6,442,215 | B1 | * | 8/2002 | Amtmann .................... 375/316 |
| 6,536,947 | B1 | * | 3/2003 | Swartzel et al. ............ 374/102 |
| 6,614,385 | B1 | * | 9/2003 | Kuhn et al. ................... 342/51 |
| 6,946,989 | B1 | * | 9/2005 | Vavik .......................... 342/51 |

FOREIGN PATENT DOCUMENTS

FR    2 689 707 A1    10/1993

OTHER PUBLICATIONS

International Preliminary Examination Report for PCT/EP02/09818, completed Jun. 2, 2003.

* cited by examiner

*Primary Examiner*—Daryl C Pope
(74) *Attorney, Agent, or Firm*—Griffin & Szipl, P.C

(57) ABSTRACT

The method of managing receiver means of a transponder activates the transponder periodically during listening periods (12A, 12B; 14A, 14B, 14C) to detect a carrier and then to receive a message. If the carrier is an unwanted carrier, and thus no message is received, the sensitivity of the transponder for receiving electromagnetic signals is reduced, in particular by reducing the gain of an input amplifier. In a preferred variant, the sensitivity is increased after a given period of reduced sensitivity or a given period of absence of reception of an unwanted carrier.

11 Claims, 3 Drawing Sheets

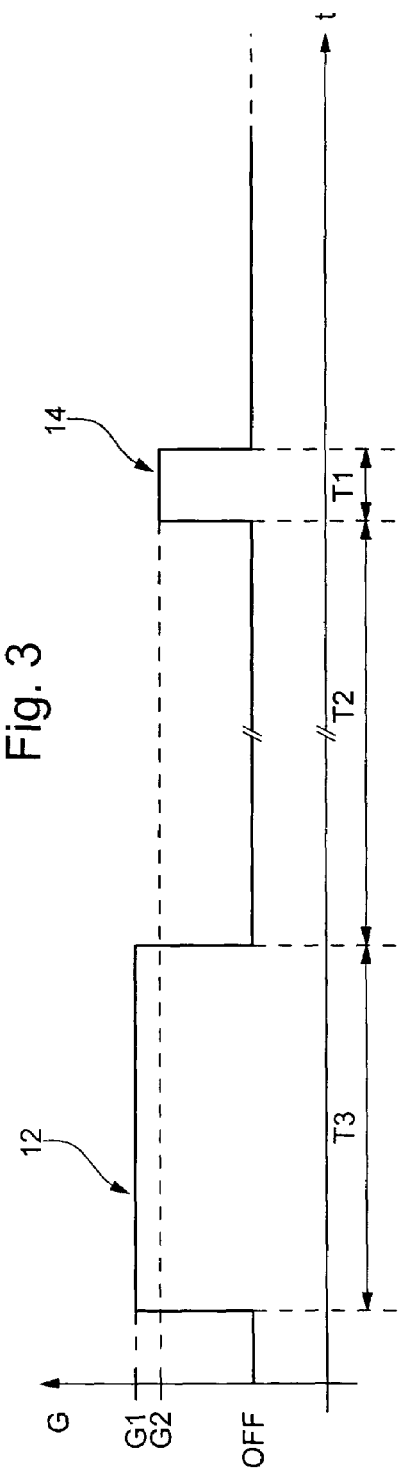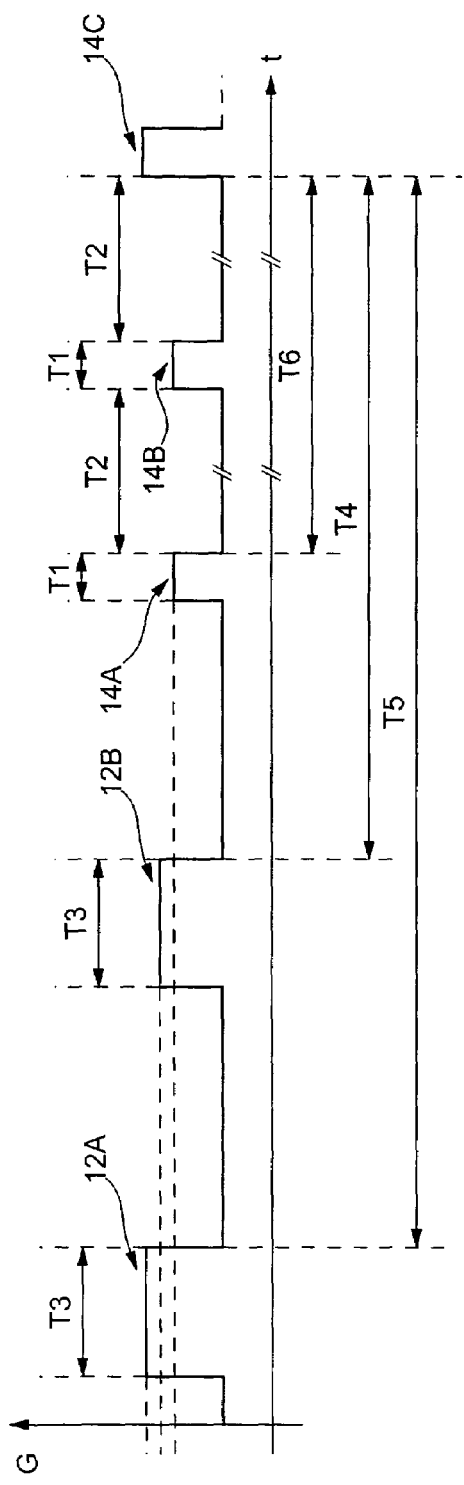

METHOD FOR MANAGING RECEIVER MEANS OF A TRANSPONDER ADAPTED TO COMMUNICATE AT RELATIVELY LONG DISTANCE

This is a National Phase Application in the United States of International Patent Application No. PCT/EP02/09818 filed Sep. 3, 2002, which claims priority on European Patent Application No. 01203583.8, filed Sep. 21, 2001. The entire disclosures of the above patent applications are hereby incorporated by reference.

FIELD OF THE INVENTION

The invention relates to a method of managing receiver means of at least one transponder adapted to communicate with at least one reader or sender at relatively long distance by means of electromagnetic waves, in which method said at least one transponder is activated periodically in a listening mode during listening periods each having a predetermined first duration if no carrier is detected and a second duration greater than said first duration if said transponder detects a carrier.

The invention relates more particularly to a method of managing receiver means of a transponder that activates said receiver means in the manner depicted diagrammatically in FIG. 1 by three activation diagrams (A), (B) and (C) representing three different situations. The diagram (D) depicts a variant of the third situation.

BACKGROUND OF THE INVENTION

The diagram (A) shows the activation of the receiver means of a prior art transponder if no carrier is detected. The receiver means are activated periodically in a listening mode during listening periods having a duration T1 and separated by a time interval T2. The duty cycle T1/T2 is relatively low to minimise the power consumption of the transponder.

If the transponder receives a message addressed to it, as shown in the diagram (B), the transponder detects the presence of a carrier in a listening period and maintains the receiver means activated to await the message and while receiving this particular message. On the other hand, if the carrier is an unwanted carrier, the diagram (C) applies. If the transponder receives a carrier during a listening period, it maintains the receiver means activated to await a message addressed to it. After a certain time, if no message that can be detected correctly by the transponder has arrived on the carrier (or, in a different embodiment, if the message is not addressed to the transponder), the receiver means are deactivated again after a time period T3 that is greater than the duration T1 of the diagram (A) situation. The receiver means are activated again either after a time interval equal to T1+T2 from the start of the listening period or after a time period T2 from the end of the listening period, as shown in the diagram (D).

Given that the duration T3 is greater than the duration T1, and generally significantly greater, in the case of receiving an unwanted carrier the duty cycle between the period of activation and the subsequent period of deactivation is generally greatly increased. In the situation of the diagram (A), the average consumption can be estimated at approximately 1.5 µA. On the other hand, in the situation of diagram (C) or (D), the average consumption may be approximately ten times greater, i.e. approximately 15 µA. Thus in the presence of an unwanted carrier, the ratio of the "ON" and "OFF" periods of the receiver means of a transponder of the type concerned is considerably increased, which greatly increases the power consumption of the transponder. This represents a major drawback, given that limited energy is stored in a transponder.

The object of the present invention is to alleviate the drawback mentioned above by proposing a method of managing receiver means of at least one transponder adapted to communicate at relatively long distance with at least one reader or sender, for the purpose of reducing the power consumption of the transponder in the presence of unwanted carriers in particular and, in one particular embodiment, also in the situation where a carrier does not carry a message addressed to the transponder concerned.

The expression "unwanted carrier" means a carrier coming from by a device, in particular a sender, foreign to the communication system concerned. In one particular embodiment, this expression also refers to a signal coming from any reader or sender that does not carry a message addressed to the transponder concerned. In some cases the transponder may consider a message addressed to it and received only partially or erroneously as equivalent to an unwanted carrier. Nevertheless, the transponder can also be adapted to detect, in some situations at least, that a message not received correctly is likely to be a message that is relevant to it and comes from a reader or sender of the communication system to which it belongs.

SUMMARY OF THE INVENTION

The above object of the invention is achieved by a method of the type described in the introduction to the present description of managing receiver means of at least one transponder, characterised in that, if an unwanted carrier is detected, the sensitivity of said at least one transponder is reduced at least for a future listening period, at least if the sensitivity of said transponder is higher than a certain minimum value.

Note that it is not necessary, for the purposes of the present invention, to determine a minimum sensitivity value of the transponder when its receiver means are activated. However, this kind of feature is included in one embodiment to prevent the sensitivity falling excessively in the presence of a high level of noise that may be only momentary.

In a preferred embodiment, the sensitivity of the transponder is increased, if it has previously been reduced, after a given period of reduced sensitivity or of absence of reception by said transponder of an unwanted carrier.

Thanks to the features of the invention referred to hereinabove, it is possible to reduce considerably the power consumption of a transponder when it is in the field of unwanted signals in its own range of frequencies. This is because, for as long as the transponder detects the presence of an unwanted carrier, it reduces its sensitivity, at least to a particular minimum value, so as no longer to detect the unwanted carrier and thus not to extend the subsequent listening periods to await a message. The additional feature of the preferred embodiment mentioned above further increases the sensitivity of the transponder, at least for a periodic listening period. If the unwanted carrier has disappeared or its amplitude has decreased, in particular because the transponder has moved, the transponder again enjoys optimum sensitivity.

In a first embodiment of the invention, the sensitivity is varied by varying the gain of an amplifier in the transponder for amplifying incoming signals.

In a second embodiment of the invention, the sensitivity of the transponder is varied by varying the attenuation factor of an attenuator for attenuating the amplitude of the incoming signals.

BRIEF DESCRIPTION OF THE DRAWINGS

The invention is described in more detail hereinafter with reference to the appended drawings, which are provided by way of non-limiting example, and in which:

FIGS. 3 and 4 are activation diagrams of a transponder of the invention in the presence of an unwanted carrier.

DETAILED DESCRIPTION OF THE ILLUSTRATIVE EMBODIMENTS

Figure 1:
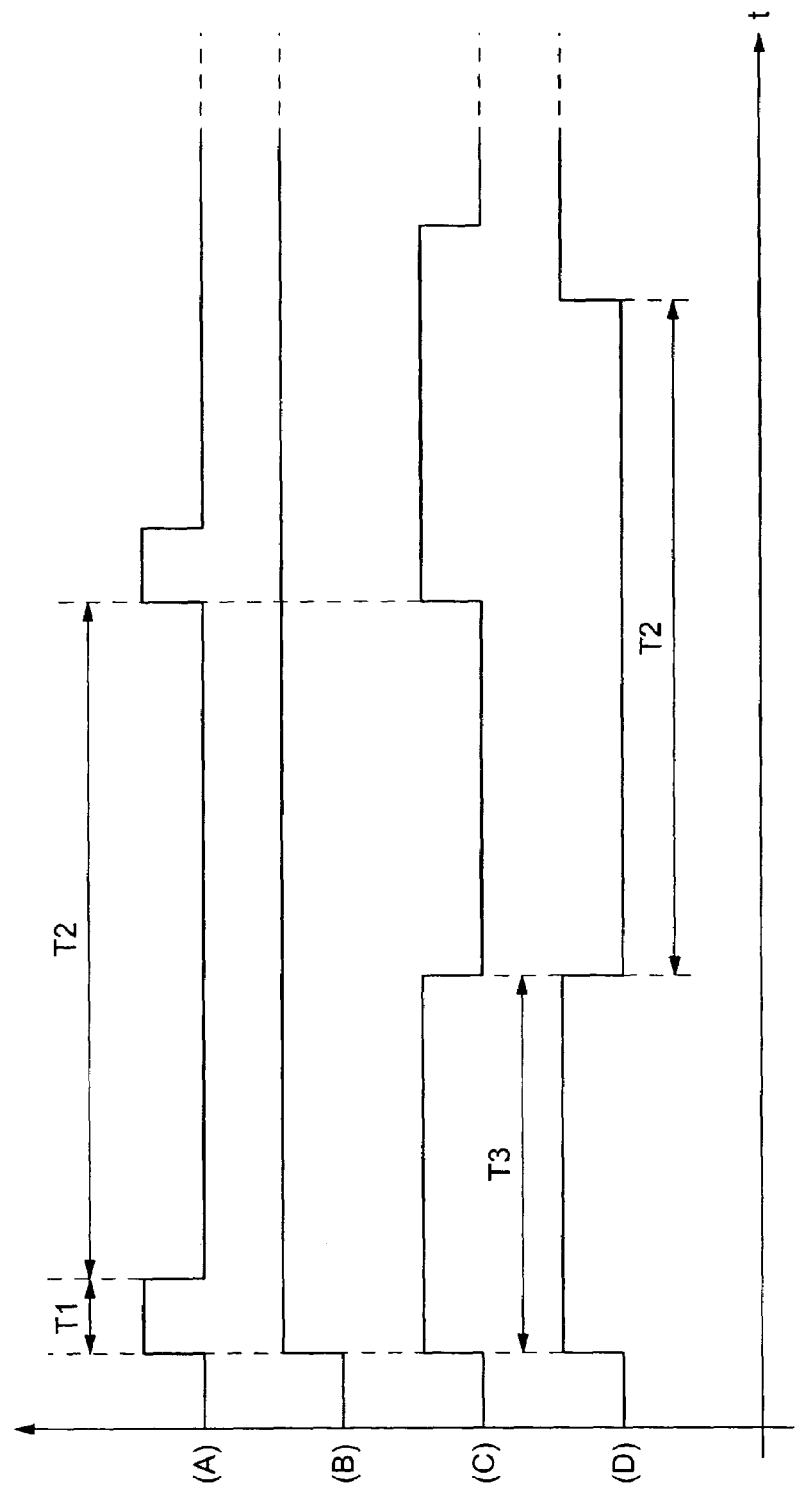
FIG. 1, already described, depicts activation diagrams for receiver means of a transponder in three different reception situations.

The transponder 2 of the first embodiment of the invention comprises an amplifier 4 for input signals SE, a unit 6 for detecting the "unwanted carrier" criterion, and a digital counter 8 controlled by the unit 6 and also by a timer 10 that is adapted to count up or down. The digital counter is connected to the amplifier to control its gain as a function of the instantaneous counter value. The person skilled in the art may envisage other embodiments.

Note that the detector unit 6 may be integrated into the circuit for demodulating the incoming signals or form an independent circuit downstream of the demodulator circuit, for example. The unit 6 and the timer 18 are also interconnected.

FIG. 3 is an activation diagram of the amplifier 4 with the gain G plotted on the ordinate axis. The gain of the amplifier 4 is equal to G1 during a listening period 12 in which the transponder 2 receives an unwanted carrier. The transponder 2 detects that the carrier is an unwanted carrier and terminates the listening period 12 after a time period T3. According to the invention, the value of the counter 8 is modified so that the gain is reduced from G1 to G2 for the next listening period 14. In the FIG. 3 variant, reducing the gain to the value G2 is sufficient to reduce the sensitivity of the transponder so that the unwanted carrier detected during the period 12 is not detected during the period 14, which then has a duration of only T1. As in the curve (D) in FIG. 1, the activation periods 12 and 14 are separated by a deactivation period T2, and likewise the listening period 14 and the period that follows it.

In FIG. 4, the gain G of the amplifier 4 is reduced a first time after a listening period 12A in which an unwanted carrier is received and a second time in a listening period 12B in which the unwanted carrier is still received. However, the unwanted carrier is no longer received in the next listening period 14A, and the activation time of the transponder is equal to T1.

In a preferred embodiment of the invention, the sensitivity of the transponder is increased again after a period of reduced sensitivity. For the transponder 2, the sensitivity is increased by increasing the gain G of the amplifier 4. To this end, in a first variant, the timer 10 is commanded to measure a period T6 beginning substantially at the end of the period 14A corresponding to the first listening period in which the unwanted carrier previously detected is no longer received by the transponder. In a second variant, the timer is reset and the gain is reduced each time an unwanted carrier is received in a listening period. Thus the period T4 in which no unwanted carrier is received begins substantially at the end of the listening period 12B. In a further variant, the sensitivity of the transponder may be increased again after a period T5 of reduced sensitivity, i.e. a period in which the gain was reduced in the first embodiment of the transponder.

In the variant shown in FIG. 4, the gain in the period 14C following the period of reduced sensitivity or in which no unwanted carrier is received is increased again to a maximum level corresponding to that of the period 12A. In another variant, the increase is effected in steps, the gain being increased to the preceding level for a new period.

Note that the gain may be reduced and increased in various ways. For example, it can be varied in steps of fixed value or in steps proportional to a certain factor, such as 10% to 20%. Other variants can provide a greater reduction when the gain is close to its maximum value than when it is approaching a lower limit value of the sensitivity of the transponder.

Figure 2:
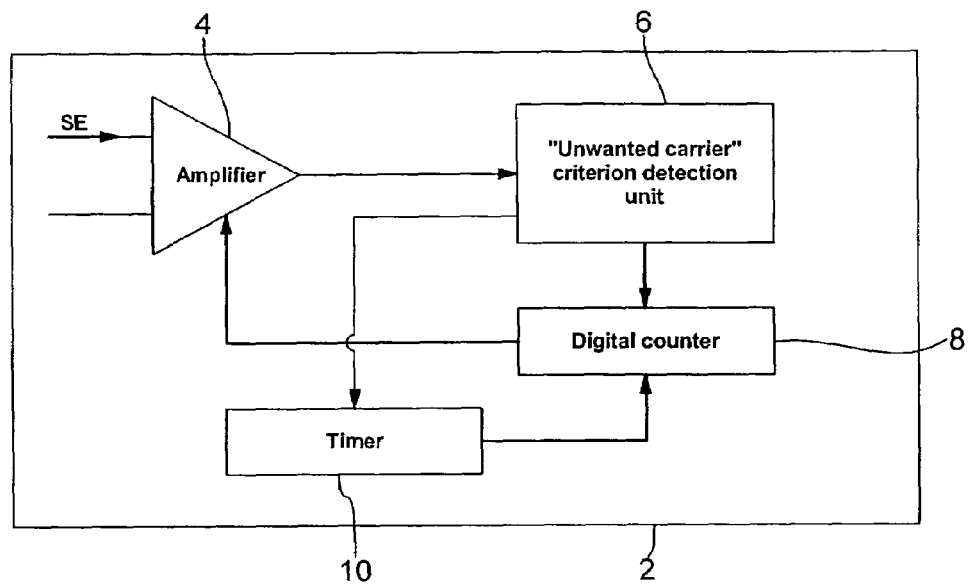
FIG. 2 depicts part of a first embodiment of a transponder of the invention.

In one particular embodiment of the FIG. 2 transponder, the amplifier is a variable gain (AGC) amplifier whose gain is controlled automatically as a function of the amplitude of the received signal. In this case, the maximum value of the gain is varied to vary the sensitivity of the transponder. In an improved variant, means are integrated into the transponder for measuring the actual gain of the amplifier when receiving a signal, in particular an unwanted carrier, and reducing the maximum gain so that it is less than the measured gain, at least when it is above a given minimum value. The gain of an AGC amplifier yields directly information on the level of the input signal. Accordingly, to ensure that the unwanted signal is not detected again in a subsequent listening period, the maximum gain of the amplifier is reduced below the gain necessary to obtain an amplitude such that a wanted signal is detected. For example, the maximum gain is reduced to a value approximately 20% below the gain measured in a period 12, as shown in FIG. 3. The measured gain is stored in a capacitor (analog memory), for example, or converted into a digital signal by a converter known to the person skilled in the art.

In one particular embodiment, the transponder is able in some cases to recognise that a message detected only partly or erroneously comes from a reader or sender belonging to its communication system. In this case, in this particular embodiment, the sensitivity of the transponder is increased if it has previously been reduced, in order to improve the detection of a message carried by a carrier received during a future activation period. In another variant, the receiver means of the transponder can remain active as soon as a message likely to have come from a reader or sender associated with the transponder is received. Nevertheless, it is possible to consider a carrier supplied by a reader or sender of the communication system of the transponder as an unwanted carrier if the message is not addressed to the transponder concerned, and to proceed in the manner previously described herein, or to maintain the gain at its current level in this latter case.

Figure 5:
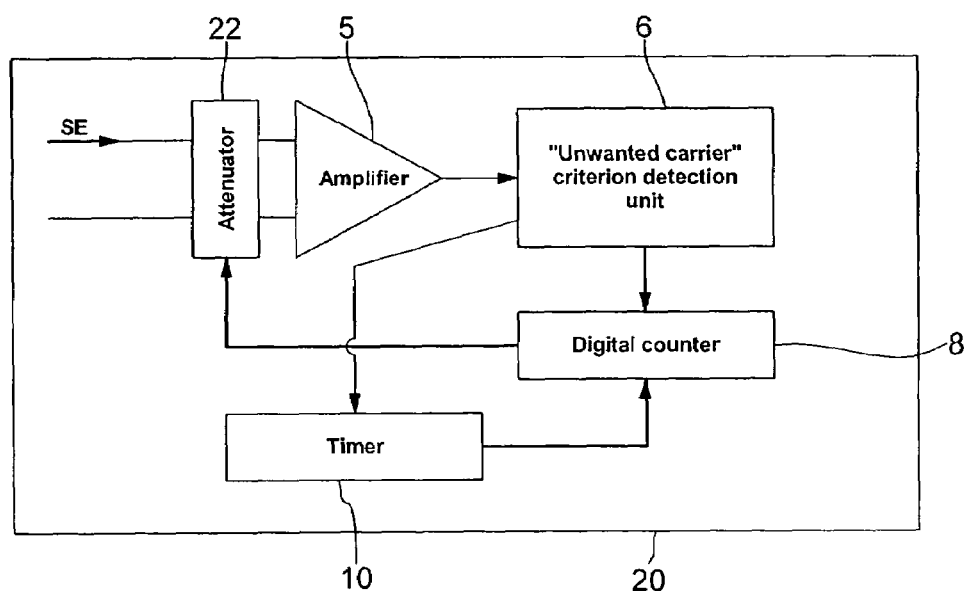
FIG. 5 depicts diagrammatically a second embodiment of a transponder of the invention.

FIG. 5 shows a second embodiment of a transponder according to the invention. The transponder 20 comprises an attenuator 22 providing means for varying the sensitivity of the transponder. In this case, the digital counter 8 varies the attenuation factor of the attenuator 22. The attenuator 22 is on the upstream side of the amplifier 5 relative to the incoming signal SE. The other elements of the transponder 20 correspond to those shown in FIG. 2. Accordingly, after an unwanted carrier is detected, increasing the attenuation factor reduces the sensitivity of the transponder. When the attenuation is sufficient, the transponder 20 no longer detects the unwanted carrier, with the result that the subsequent listening periods have a duration T1.

What is claimed is:

1. A method of managing receiver means of at least one transponder adapted to communicate by electromagnetic waves with at least one reader or sender, in which method said transponder is activated periodically in a listening mode during listening periods each having a predetermined first duration if no carrier is detected in a listening period and a second duration greater than said first duration if a carrier is detected in a listening period, which method is characterised in that, if an unwanted carrier is detected, the sensitivity of said at least one transponder is reduced at least for a future listening period, at least if the sensitivity of said transponder is higher than a certain minimum value.

2. A communication method according to claim 1, wherein the sensitivity of said transponder is increased, if it has previously been reduced, after a given period of reduced sensitivity or a given period of absence of reception of an unwanted carrier.

3. A method according to claim 2, wherein increasing the sensitivity of said transponder entails increasing it to a preceding level of sensitivity.

4. A method according to claim 2, wherein increasing the sensitivity of said transponder entails increasing it to a maximum sensitivity level.

5. A method according to claim 1, wherein said sensitivity is increased if it has previously been reduced and if a message detected only partially or erroneously indicates that the received carrier comes from said at least one reader or sender.

6. A method according to claim 1, wherein the sensitivity is reduced by reducing the gain of a fixed gain amplifier in said at least one transponder for amplifying incoming signals.

7. A method according to claim 1, wherein the sensitivity is reduced by reducing the maximum gain of a variable gain amplifier in said at least one transponder for amplifying incoming signals.

8. A method according to claim 7, wherein said at least one transponder includes means for measuring the gain of said amplifier when receiving a signal, in particular an unwanted carrier, and the maximum gain is reduced to a value less than that of the measured gain, at least if said real gain is greater than a minimum value.

9. A method according to claim 1, wherein the sensitivity is reduced by increasing the attenuation factor of an attenuator in said at least one transponder for reducing the amplitude of incoming signals.

10. A transponder comprising means for communicating by means of electromagnetic waves with at least one reader or sender and control means for periodically activating said transponder in a listening mode, at least in a given operating mode, which transponder is characterised in that it further comprises means for varying its sensitivity for receiving electromagnetic signals, said control means being adapted to reduce said sensitivity, at least for a future listening period, if an unwanted carrier is detected during a listening period and at least if the sensitivity of the transponder in said listening period is greater than a minimum value.

11. A transponder according to claim 10, wherein it further comprises a timer for measuring either a given period of reduced sensitivity or a given period of absence of reception of an unwanted carrier with said reduced sensitivity and said control means are adapted to increase the sensitivity of the transponder after said given period.

* * * * *